Nov. 8, 1960 T. R. SYKES 2,959,273
ROLLER SLAT CONVEYOR CONTROL DEVICE
Filed Aug. 8, 1955 5 Sheets-Sheet 1
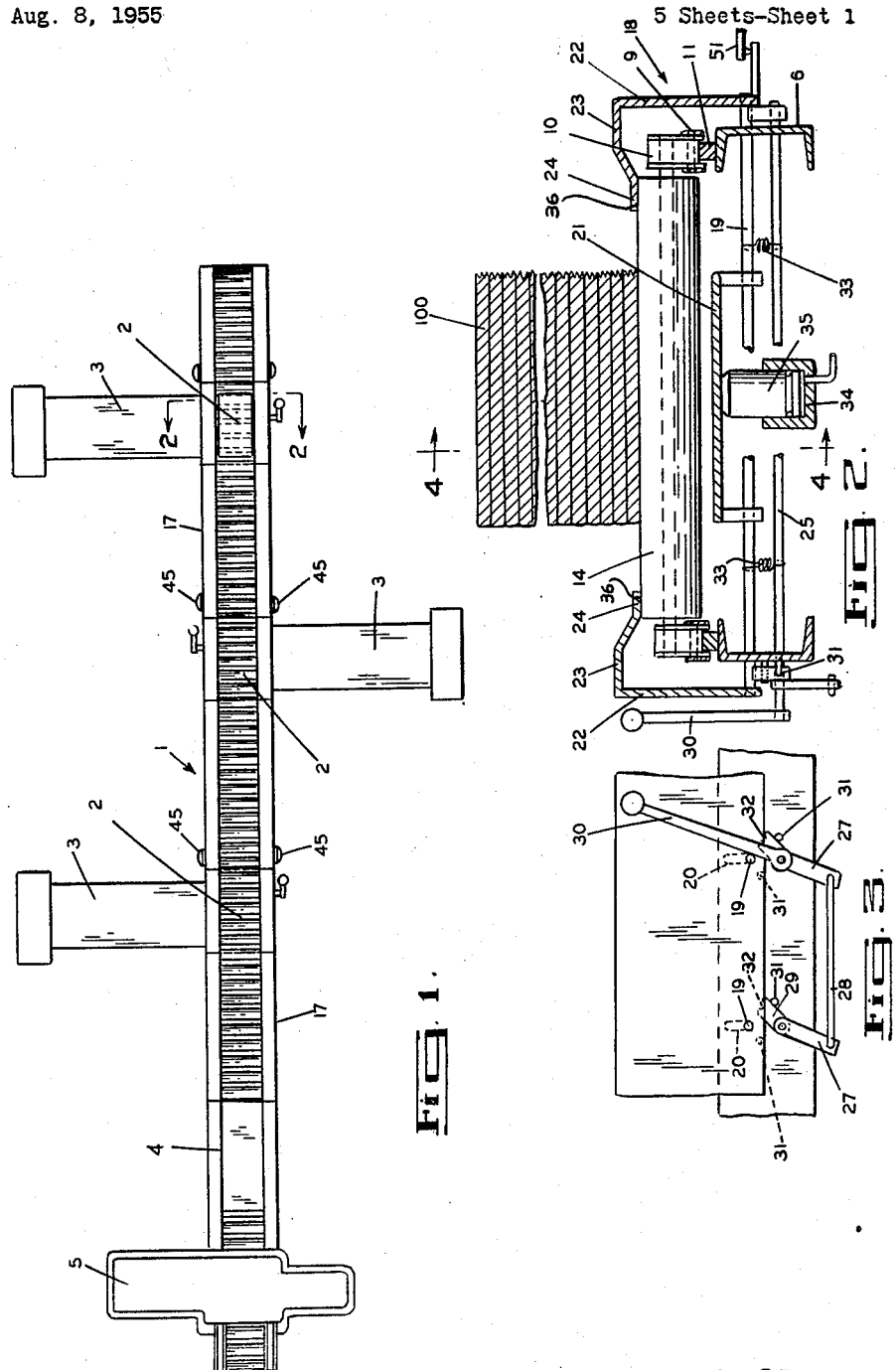
INVENTOR
THOMAS R. SYKES
BY Douglas S. Johnson
ATTY.

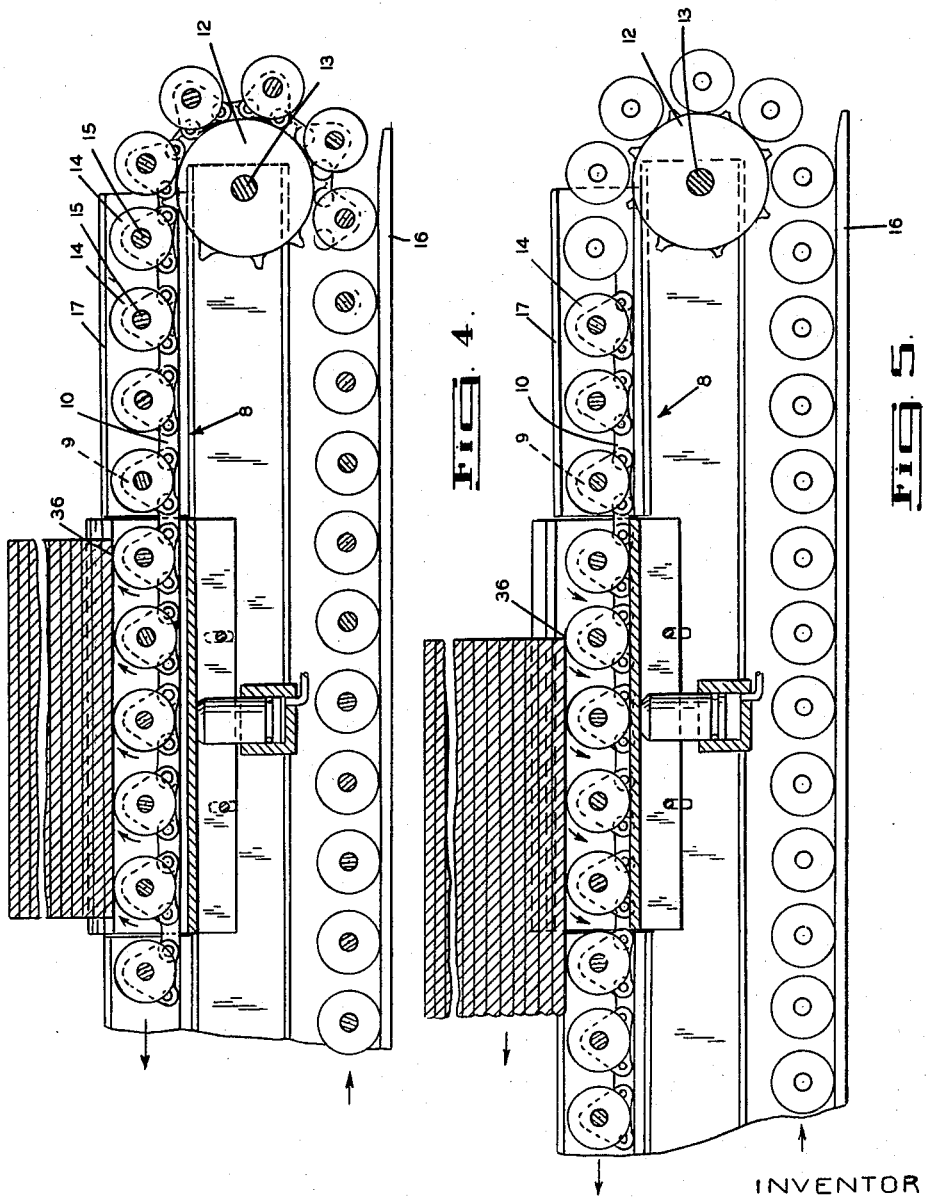

Nov. 8, 1960
T. R. SYKES
2,959,273
ROLLER SLAT CONVEYOR CONTROL DEVICE
Filed Aug. 8, 1955
5 Sheets-Sheet 3
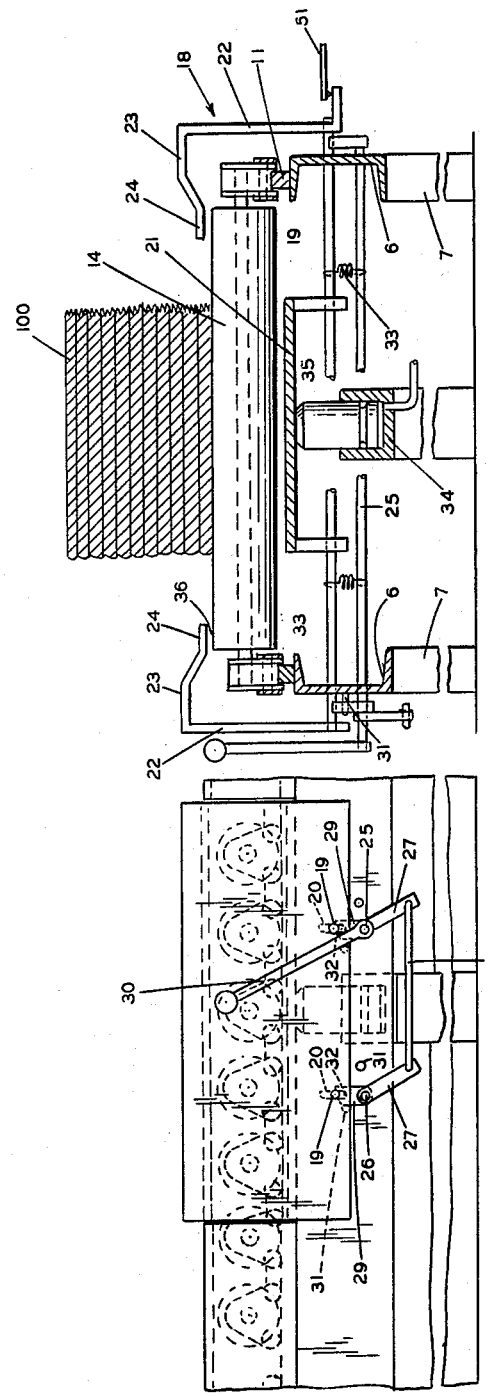
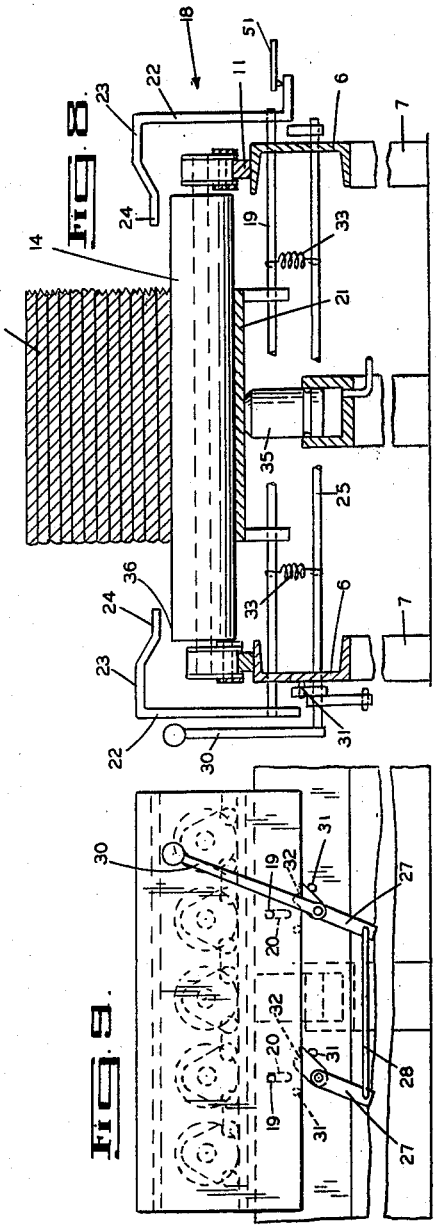
INVENTOR
THOMAS R. SYKES
ATTY Nov. 8, 1960    T. R. SYKES    2,959,273
ROLLER SLAT CONVEYOR CONTROL DEVICE
Filed Aug. 8, 1955    5 Sheets-Sheet 4

INVENTOR
THOMAS R. SYKES
ATTY.

Nov. 8, 1960   T. R. SYKES   2,959,273
ROLLER SLAT CONVEYOR CONTROL DEVICE
Filed Aug. 8, 1955   5 Sheets-Sheet 5
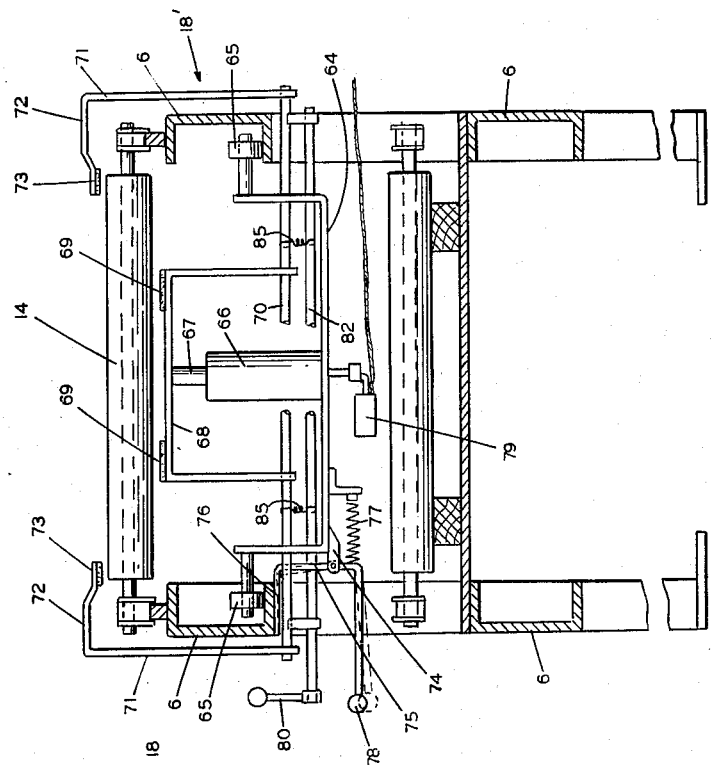
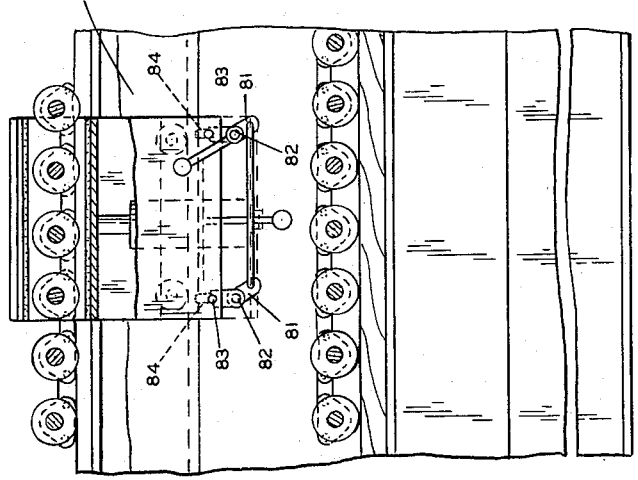
INVENTOR
THOMAS R. SYKES United States Patent Office 2,959,273
Patented Nov. 8, 1960

2,959,273

ROLLER SLAT CONVEYOR CONTROL DEVICE

Thomas R. Sykes, Toronto, Ontario, Canada, assignor, by mesne assignments, to Toronto Star Limited, Toronto, Ontario, Canada Filed Aug. 8, 1955, Ser. No. 527,031

17 Claims. (Cl. 198—183)

This invention relates to a device for controlling movement of articles along a "roller slat" or "roller flight" conveyor.

There are many instances where it is desirable to control the movement along a conveyor of articles such as cartons or other containers to be filled, or material such as newspapers to be counted, or where some other assembly line operation is to be performed or conveyor feed halted at a point along the conveyor. In such instances it is frequently highly desirable to enable the feed of such articles or material to be stopped at a particular point or station for an indefinite time.

Once the operation being performed has been completed or the reason for feed stoppage has disappeared, it is usually desirable to start the article or material which has been withheld from feed along the conveyor out of the station and down the conveyor as quickly as possible to allow immediate entry of the subsequent article or material. It will be appreciated that starting and stopping of the conveyor itself would be impractical and moreover any such operation must necessarily halt the feed of all articles or materials on the conveyor whether they are approaching, at, or beyond the station where, for instance, the filling, packing, counting or other operation is taking place.

It is therefore one of the prime objects of the present invention to enable articles or materials being fed down a conveyor to be halted for either a definite or indefinite time without interrupting feed up to or beyond the station.

Another important object is to enable the article or material held at the "operation" station to be quickly delivered out of the station when the operation is completed in order to receive the subsequent article or material on the conveyor into the station for the performance of the operation therein.

A further object is to enable any point or section of the conveyor to be converted into a station at which the articles or material can be halted and then, when desired, rapidly ejected therefrom. In this connection it is a further important object to enable the position of such station to be quickly and easily changed along the length of the conveyor so that delivery of articles or materials onto the conveyor to be temporarily held stationary on the conveyor at their point of receipt can be effected from the side of the conveyor at any point along its length.

It will be appreciated that from time to time, according to the desired functioning of the conveyor, it may be desirable that the conveyor feed be continuous without interruption at such stations and in this connection it is an important object to enable such stations to be quickly and easily rendered inoperative to allow normal conveyor operation therethrough.

Still a further object is to provide a simple, economical, and readily controlled means for creating such stations along a conventional conveyor, controlling ejection from such stations, and rendering such stations inoperative to allow normal conveyor feed through the stations without requiring any modification of the conveyor. In particular, it is an important object to provide such means as will be capable of being controlled to provide either manual operation or any automatic cyclic operation or any other completely or semi-automatic operation responsive to conveyor feed as may be desired.

The principal feature of the invention resides in the provision of an arrangement of brake shoes and their control to engage the rollers of a roller slat or roller flight conveyor while the conveyor is in motion.

In one particular aspect of the invention sets of brake shoes are arranged with a shoe or shoes disposed above and below the rollers of the conveyor with the shoes being tied together and mounted for vertical movement and means are provided for selectively bringing the upper or under shoes into engagement with the rollers for selectively creating a stationary platform or station section at a point along the conveyor or creating a conveyor section moving at twice conveyor speed for rapid ejection of articles or materials out of or past the station section.

According to a further feature of the invention the brake shoe arrangement comprises an assembly independent of and movable along the conveyor to locate the brake shoes at any desired point selected along the length of the conveyor.

Still a further feature resides in providing means to release both the upper and under brake shoes from braking engagement with the rollers to allow normal conveyor operation.

According to another aspect of the invention, an important feature resides in the provision of an arrangement of brake shoes which can be actuated into braking engagement with the rollers of the conveyor and released therefrom to produce a stationary platform on the conveyor for the length of time required for the particular operation being performed on the articles or material being fed along the conveyor.

In this connection it is a feature of the invention to provide a control means, either manually operated or automatically operated in response to the feed of material on the conveyor to actuate the brake shoes so that their operation can be instantly altered to suit the requirements of conveyor feed.

These and other objects and features will become apparent from the following detailed description taken in conjunction with the accompanying drawings in which:

Figure 1 is a plan view illustrating a conveyor to which the invention has been applied to create a plurality of stations at which material or articles may be held or collected along the length of the conveyor.

Figure 2 is an enlarged vertical sectional view partly broken away, taken on the line 2—2 of Figure 1, and showing the brake shoe arrangement actuated to create a stationary platform on which a stack or bundle is retained.

Figure 3 is an enlarged fragmentary side elevational view of the conveyor portion adjacent to the section 2—2.

Figure 4 is an enlarged fragmentary mid-vertical sectional view of one end of the conveyor taken on the line 4—4 of Figure 2.

Figure 5 is a view similar to Figure 4, but showing the brake shoe arrangement actuated to eject the bundle rapidly from the station.

Figure 6 is a view similar to Figure 2 but showing the brake shoes released from roller engagement to allow normal feed along the conveyor.

Figure 7 is a side elevational view of the conveyor portion shown in Figure 6, showing the position of the control mechanism for effecting brake shoe release.

Figure 8 is a view similar to Figure 6 but showing the bottom brake shoe in roller braking engagement for rapid bundle or package ejection from the station.

Figure 9 is a view similar to Figure 7 but showing the position of the control mechanism for allowing roller engagement by the bottom brake shoe.

Figure 13 is a transverse vertical sectional view through a conveyor with which is associated a movable brake system constructed in accordance with the invention.

Figure 14 is a fragmentary side elevational view partly broken away of the modified form of the invention shown in Figure 13.

Figure 10:
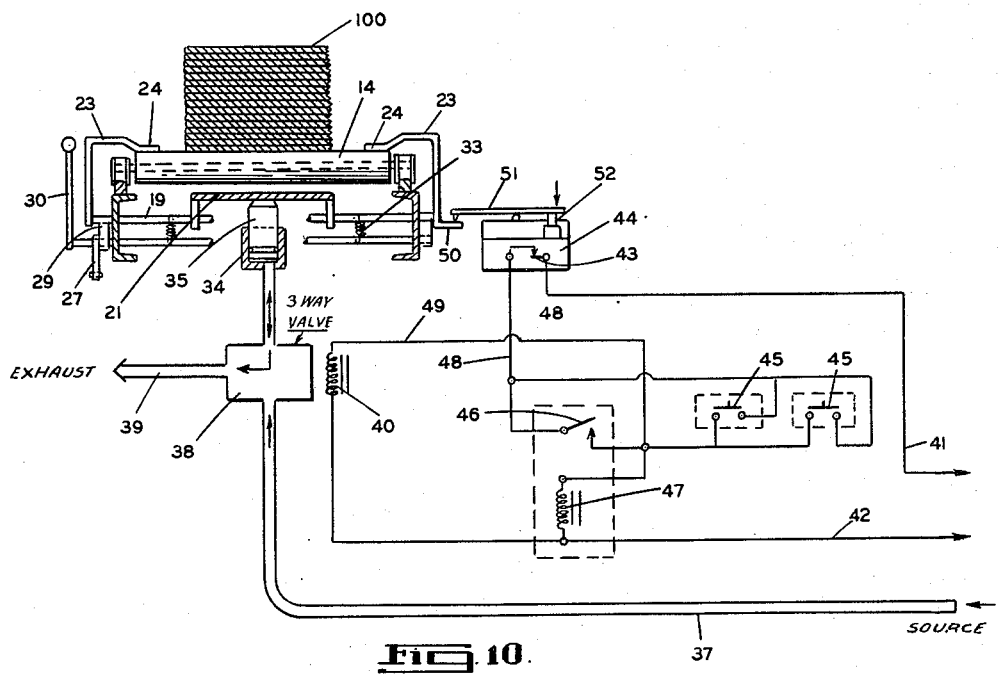
Figure 10 is a part diagrammatic, part schematic view illustrating the control circuit for controlling the brake shoe arrangement shown in Figures 2 to 8, and showing the upper brake shoes as being normally in engagement with the conveyor rolls.

With reference to the drawings, 1 designates a roller slat conveyor generally of the type illustrated in U.S. Patent No. 2,619,027, issued November 25, 1952, but it will be understood that the invention is applicable to any endless roller slat conveyor in which the rollers translated during conveyor operation are mounted for rotation.

In the assembly shown in Figure 1, the conveyor is shown as provided with a plurality of sections indicated at 2 disposed opposite the ends of lateral delivery stations 3. According to the invention the conveyor sections 2 have associated therewith a brake shoe arrangement hereinafter more particularly described which convert the sections 2 into stations at which material or articles may be gathered and held stationary without interrupting normal conveyor operation and which can be converted into express conveyor sections to eject or speed up the movement of the material or articles disposed or arriving at the section.

The conveyor is illustrated with a typical setup for the handling of newspapers in a newspaper mailing room where the papers are fed from the delivery stations 3 onto a conveyor and held there until a sufficient number has been collected at the particular station or conveyor section 2, and then the papers are delivered onto a wrapping device 4 and a tying machine 5, both shown in diagrammatic block form, as they form no part of the present invention.

While the detailed description set out hereinafter makes reference to the handling of sheet material such as newspapers on the conveyor, it will be understood that such an application of the invention is for illustrative purposes only, and the invention is equally as applicable to the handling of packages, containers or other items whose movement is to be controlled along a conveyor without interrupting conveyor feed.

The conveyor 1 comprises essentially a frame in the form of longitudinal channels 6 carried on legs 7 as best seen in Figures 2, 6 and 8.

The moving portion of the conveyor comprises a pair of spaced endless chain-like formations generally designated at 8 in Figures 4 and 5. These endless elements 8 comprise a plurality of triangular bearing links 9 connected together by coupling links 10. The links 9 and 10 are supported by rails 11 mounted on the upper flanges of the channel 6 as shown particularly in Figures 2, 6 and 8 and pass over end sprockets 12 shown in Figures 4 and 5.

The sprockets 12 are mounted on suitable drive shafts with the shaft at one end only being shown in Figures 4 and 5 indicated at 13. The drive to the shaft 13 has been omitted, and it will be appreciated it may take any desired form.

Figures 2, 6 and 8 show the upper reach of the moving endless portion of the conveyor only for sake of clarity, while Figures 4 and 5 show the under return reach of the endless conveyor mechanism.

As will be seen, the endless conveyor mechanism comprises in addition to the spaced endless elements 8 cross slats in the form of rollers 14 carrying shafts 15 journalled in the triangular bearing links or lugs 9 of the endless chain elements 8.

As shown in Figures 4 and 5, a guide 16 is preferably located beneath the lower reach of the roller slats 14 to support the slats in their return movement below the channels 6.

The roller slat conveyor so far described is of conventional design and in itself forms no part of the present invention.

The conveyor is provided with suitable sides 17 between the sections 2 where the brake arrangements in accordance with the invention have been applied. Each of the sections 2 is identical and the description of one section only is hereinafter detailed.

The brake arrangement, according to the invention, is generally designated at 18 in Figures 2, 6 and 8. This arrangement comprises a pair of spaced cross rods 19 guided for vertical movement in vertical slots 20 formed in the channels 6 at the particular section 2. Between the channels 6 and below the upper reach of the rolls 14 is arranged a central brake shoe 21 fixed to the rods 19. Carried by the outer extremities of the rods 19 are a pair of side plates 22 formed with flanges 23 projecting inwardly from their upper edges and extending downwardly to terminate in horizontal flat shoe sections 24 which are adapted to overlie the outer ends of the upper reach of rolls 14 arriving at the conveyor section 2.

Journalled in and extending through the channels 6 are a pair of spaced rods 25 and 26, each of which carries at each end on the outside of the respective channel 6 a lever 27, the lower ends of the levers being connected together by links 28 while the upper ends are in the form of cam extensions 29 adapted to engage the rods 19 when the levers 27 are swung to the position of Figure 7 to lift the rods 19 part way up the vertical slots 20. A control lever 30 is secured to one of the rods 25 to effect on rotation thereof movement of both of the levers 27 on each side of the conveyor through the link connections 28. Suitable stop pins 31 are provided on the channels 6 to restrict movement of the levers 27 between the positions of Figures 3 and 7. The cam extensions 29 of the levers are shown as provided with notches 32 into which the rods 25 and 26 move when control lever 30 is swung to the position of Figure 7.

The control lever is thus maintained in position 7 against accidental displacement under the weight of the brake arrangement 18 which is assumed by the levers 27 when the cross rods 19 enter the notches 32.

Additional biasing of the brake shoe arrangement downwardly towards the position of Figure 2 is preferably provided in the form of springs 33 connected between the rods 25 and 26 and the vertically movable cross rods 19. While the power device for actuating the brake arrangement 18 may be of any desired form, a particularly simple and effective power device comprises an hydraulic or pneumatic cylinder 34, the piston 35 of which is adapted to contact the lower brake shoe 21 to force the brake arrangement 18 upwardly against its own weight, and against the action of the springs 33 to bring the lower brake shoe 21 into engagement with the under surfaces of the rolls 14 arriving at the particular section 2 of the conveyor.

When the upper brake shoe sections or members 24 are in engagement with the upper surfaces of the rolls arriving at the particular section 2 as shown in Figure 2 the upper points of these rolls contacted by the brake shoes 24 will be held stationary against linear travel longitudinally of the conveyor, and a stationary platform or section will be formed on the conveyor. While the upper points of the rolls indicated at 36 in Figure 2 are stationary, the endless chain elements 8 continue their travel and to accommodate this movement of the endless chain elements, the rollers contacted by the brake shoe sections 24 must rotate to provide points on the surfaces of the rolls diametrically opposite to the points 36 which have a velocity of twice the speed of translation or movement of the endless chain elements 8.

With reference to Figure 4, it will be seen that with the conveyor chain elements 8 moving in a counter clockwise direction, the rollers 14 at the conveyor section 2 will rotate in a clockwise direction rolling on the underside of the brake sections 24 with the surface velocity of the rollers at the points of contact with the brake sections 24 and indicated at 36 in Figure 4, having zero velocity, and the points of the rollers diametrically opposite to the points 36 having maximum velocity of twice conveyor speed.

When the brake shoe 21 is brought up against the under surfaces of the rolls 14 arriving at the section 2 the reverse happens as illustrated in Figure 8, and particularly in Figure 5. The points on the roll surfaces directly opposite to the points 36 in Figure 4 have zero velocity, and the points of the rolls corresponding to the points 36 in Figure 4 have maximum velocity in a counter clockwise direction.

When the brake shoes 21 and 24 are in the position of Figures 6 and 7, the conveyor will operate in its normal fashion with the rollers 14 simply having a translatory movement as slats of the conveyor.

It will be appreciated that the control system for controlling the operation of the brake shoe arrangement 18 may have many different forms. A simplified form of control system is shown in Figure 10. In this system as correlated with Figures 2 to 8, the upper brake shoes 24 are maintained normally in contact with the upper surfaces of the rollers 14 arriving at the section 2 of the conveyor under their own weight and the biasing influence of the springs 33 with the cylinder 34 de-energized. Thus, a stationary platform is normally created at the section 2.

Air to the cylinder 34 is led from a supply source through inlet pipe 37 to a three-way valve 38 having a discharge or exhaust passage 39. The valve 38 is controlled by a solenoid 40 which is normally de-energized. The energy for the solenoid 40 is supplied through a pair of leads 41, 42, the lead 41 leading through a normally closed switch 43 of a suitable time delay device 44 to one side of a pair of control switches 45 indicated in Figure 1 as located on opposite sides of the conveyor at each section 2 in position to be contacted by an operator swinging his hip against the switch to actuate it from its normally open position to momentarily close until hip pressure is released.

In parallel with the hip switches 45 is a latch in switch 46 of a relay 47 which is energized through either of the hip switches 45. Upon actuation of either of the hip switches 45 to momentarily close the switches, relay 47 is energized electrically latching in switch 46 so that current flow is maintained on release of the switch 45 through line 41, normally closed switch 43, line 48, relay contacts forming switch 46, through line 49 to solenoid 40, the other side of which is connected back to line 42. The energization of solenoid 40 actuates the valve 38 to introduce compressed air into the cylinder 34 moving piston 35 upwardly to force the bottom brake shoe 21 into contact with the under surfaces of the rollers 14 arriving at the section while simultaneously releasing the brake shoes 24 from engagement with the upper surfaces 36 of the rollers.

The "stationary platform" previously provided on the conveyor at section 2 is essentially instantly converted into a moving platform, the surface speed of which is twice conveyor speed so that any article or material held at the stationary platform is rapidly ejected on down the conveyor.

One of the side plates 22 of the brake arrangement 18 is provided with a projection 50 which actuates a lever 51 on upward movement of the plate 22 which lever is arranged to operate a plunger mechanism 52 to effect opening of the normally closed switch 43 of the time delay device 44. It will be understood that any actual form of commercially available time delay device may be employed.

On opening of the switch 43, solenoid 40 is deenergized as is relay 47 causing the relay contacts or switch 46 to open breaking the circuit until re-energized by actuation of the control or hip switches 45. The deenergization of the solenoid 40 is arranged to open the exhaust of valve 38 whereupon the weight of the brake shoe arrangement 18 and the biasing effect of the springs 33 effects return of the upper brake shoe sections 24 downwardly into engagement with the upper surfaces of the rollers arriving at the conveyor section 2. When it is desired to render the section or station 2 of the conveyor inoperative when not in use, the control lever 30 is actuated as previously described to cam the cross rods 19 upwardly through the action of the cam extensions 29 of the levers 27 to suspend the brake shoe arrangement 18 on the levers with both the upper brake shoe sections 24 and the lower brake shoe 21 out of engagement with the surfaces of the rolls which are free to pass between the superimposed brake shoe members in the normal course of conveyor feed.

Such a system as above described has by way of illustration a useful adaptation in the handling of newspapers which may be fed from the delivery stations 3 in groups of 25 or 50 onto the stationary sections 2 of the conveyor and retained in position on the conveyor until further groups are delivered and piled on top of the first group to provide the requisite number of papers 100 in the stack. Then, when the stack is completed, the operator does not need to move the heavy weight out onto the conveyor, but simply actuates one of the hip switches 45 and the stack which has previously been held stationary on the moving conveyor is rapidly ejected on down the conveyor.

It will be understood, for instance, that when the station furthest remote from the tying machine is in operation, the control levers 30 of the other stations will be actuated to render them inoperative so that once the bundle is kicked from the stationary platform onto the normally moving portion of the conveyor it will be carried through the remaining stations without interference.

Figures 11, 12:
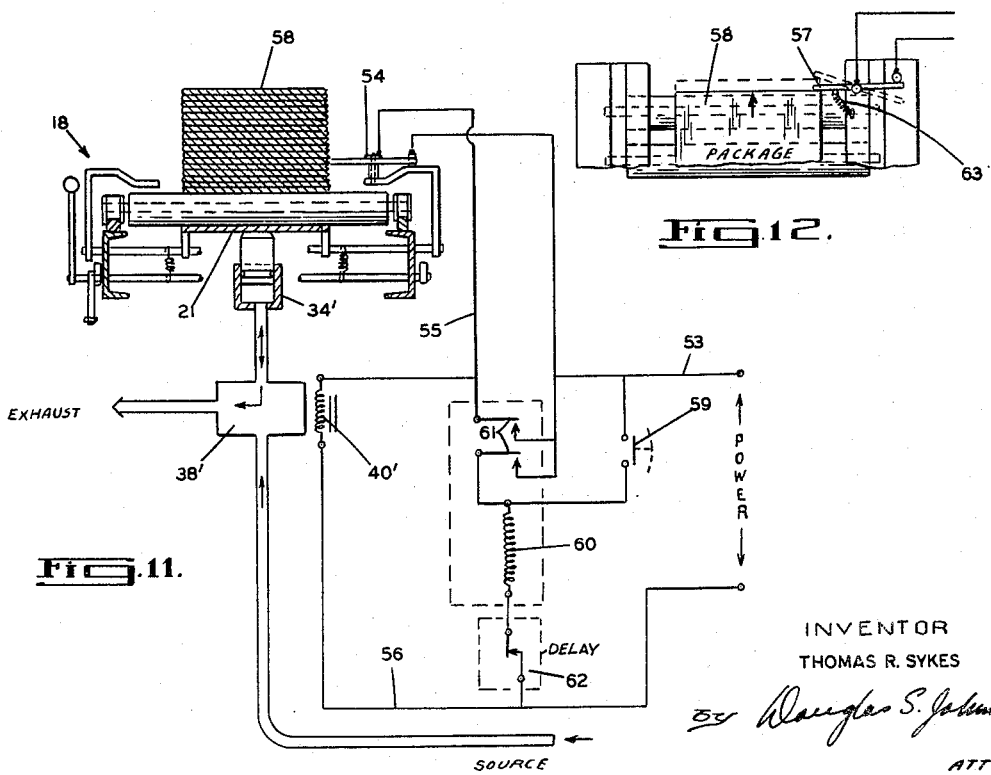
Figure 11 is a view similar to Figure 10, but showing a modified control system in which the under brake shoe is shown as being normally in engagement with the conveyor rolls pending entry of a bundle or package into the station.
Figure 12 is a plan view of the station illustrated in Figure 11 illustrating the control function of the package or bundle as it enters the station.

In the modified form of the control system illustrated in Figures 11 and 12, the brake shoe arrangement corresponding to the brake shoe arrangement 18 is shown as actuated to the "ejecting position" in which the lower brake shoe 21 is maintained in contact with the undersides of the rollers of the upper reach of the conveyor arriving at the station or section 2 of the conveyor. To accommodate this action, the solenoid 40' corresponding to the solenoid 40 is normally energized to actuate the valve 38' corresponding to the valve 38 to admit compressed air into the hydraulic cylinder 34' corresponding to the cylinder 34.

The solenoid 40' is normally energized by current flowing through line 53, through normally closed switch 54, line 55, to which one side of the solenoid is connected and line 56 to which the opposite side of the solenoid is connected, which latter line leads back to the power source.

The normally closed switch 54 includes a spring actuated contact 57 disposed in the path of a package 58 moving down the conveyor. It will be understood that the package will move normally on the conveyor until it reaches the section 2 at which time it will be rapidly projected forwardly until it strikes the contact 57, the contact being disposed so that the package will have substantially completely entered the section 2 before it is actuated by the package. The opening of the normally closed switch 54 will immediately operate valve 38' to exhaust air from cylinder 34', dropping the upper brake shoes 24 onto the upper surfaces of the rolls to brake the package to a halt.

The package 58 will then remain in the station 2 while the conveyor continues to operate for whatever length of time the operator of the conveyor wishes in order to perform the function thereon which may comprise a filling, a sealing, or, if the package 58 be replaced by a mechanism in an assembly line, for any assembly or other operation which it may be desired to have take place at the station 2. When the operator is through with his operation on the package or item held at the station 2, he may then momentarily close normally open switch 59 to energize relay 60 having electrically locked in contacts 61 through which solenoid 40' is again energized to actuate valve 38' to apply compressed air to the cylinder 34' to actuate the brake shoe arrangement to bring the bottom brake shoe 21 into engagement with the underside of the rolls.

A suitable time delay device 62 corresponding to the device 44 of Figure 10 may be incorporated in series with the relay 60 to open circuit the relay after a predetermined time sufficient to allow the accelerated rolls at the station accelerated by engagement therewith of the bottom brake shoe 21 to clear the package or article 58 from the station to allow spring 63 to reset the normally closed switch 54 to its closed position.

It will be understood that the control circuits illustrated in Figures 10 and 11 are illustrative only, and may be varied to suit the particular application of the invention.

With reference to Figures 13 and 14, there is disclosed a brake shoe arrangement 18' which functions in the manner of the brake shoe arrangement 18, but embodies a further feature of being adjustable at will along the length of the conveyor. It will be understood that with respect to the conveyor, like numerals will refer to like members in the conveyor illustrated at Figures 13 and 14 and the conveyor illustrated at Figures 1 to 12.

The brake shoe arrangement 18' comprises a U-shaped carriage 64 provided at the upper ends of the U with rollers 65 rolling on the bottom flanges of the upper channels 6 of the conveyor. The carriage 64 has mounted centrally thereon an hydraulic cylinder 66, the piston 67 of which carries a brake shoe frame 68 to the upper surface of which are secured strips of abrasive material 69 forming brake shoes corresponding to the brake shoe 21 of Figures 2, 6 and 8 to engage the under surface of the rolls 14 of the conveyor. The brake frame 68 carries cross rods 70 operating in suitable vertical slots in the sides of the carriage 64, and these cross rods project beneath the channels 6 and carry side plates 71, the flanges 72 of which terminate in brake shoe sections 73 corresponding to the brake shoe sections 24 of Figures 2, 6 and 8.

The relationship between the brake shoes 69 and 73 is such that when the brake shoes are in the neutral position of Figure 13 neither set is in contact with the rolls 14 of the conveyor. It will be understood that upward movement of the under brake shoes 69 into engagement with the under surfaces of the rolls 14 will further elevate the upper brake shoes and vice versa.

Pivotally supported on a bracket 74 carried by the carriage 64 is a U-shaped brake 75, one portion 76 of the U being disposed beneath and adapted to frictionally engage the underside of one of the channels 6 under the action of a compression spring 77. The other portion of the brake member 75 forms a control handle 78 which is adapted to be operated downwardly to release the braking portion 76 from the underside of the channel to free the carriage from clamping engagement with the channel flange. When the control handle 78 is depressed, the carriage 64 is free to run along the conveyor 1 between the legs 7 to any desired position at which time, upon release of the control handle, the spring 77 will force the brake 75 on its pivot to bring the braking portion 76 into frictional engagement with the underside of the channel flange to grip the flange between the brake portion and the rollers 65 immediately thereabove.

The control for the operation of the brake arrangement 18' may, for instance, be such as shown in Figures 10 or 11 with the hydraulic circuit of the system including a solenoid operated three-way valve 79 corresponding to the valves 38 and 38' and corresponding electrical control circuit.

The carriage mounted brake shoe arrangement 18 may also be provided with a control lever 80 similar to the lever 30 for actuating the brake shoes 69 and 73 to a "neutral" position, the lever actuating link connected cam levers 81 carried on cross rods 82 journalled in the sides of the carriage frame 64. The cam levers 81 are shown as provided with cam extensions 83 adapted to engage and elevate the cross rods 70 of the brake shoe arrangement to lift these rods part way up their slots 84 to the neutral position of Figure 13.

Again suitable springs 85 may be provided to bias the brake shoe arrangement 18 downwardly to bring the top brake shoes 73 into engagement with the upper surfaces of the conveyor rolls.

With the arrangement illustrated in Figures 13 and 14 it will be appreciated that the "stationary platform" or section of the conveyor may be quickly and easily changed at will with the brake arrangement being locked or clamped in any desired position. It will be also appreciated that the device can be rendered inoperative by a simple movement of the control lever 80 so that the conveyor will operate in its normal manner without interference from the brake shoe sets.

While the brake shoe sets, e.g. 21 and 24 in Figures 1 to 12 and 69 and 73 in Figures 13 and 14, are mechanically coupled together their movement may be correlated by any other means as will be well understood.

It will be understood that various other modifications and variations in detail may be made from the specific embodiments of the invention herein illustrated by way of explanation without departing from the spirit of the invention as set forth in the appended claims.

What I claim as my invention is:

1. The combination with a longitudinally extending roller slat conveyor having upper and lower reaches and having the roller slats thereof rotatable and freely supported, whereby they normally travel without rotation on conveyor operation, of brake shoe means disposed above and below the upper reach of said conveyor at a point along its length, means correlating the movement of said brake shoe means above and below said upper conveyor reach, said brake shoe means being movable between positions with the upper brake shoe means engaging the upper surfaces of rollers arriving at said point along the conveyor length and the lower brake shoe means clear of said rollers to impart rotation in one direction to the normally non-rotating rollers and a reverse position with said lower brake shoe means engaging the under surfaces of rollers arriving at said point and said upper brake shoe means clear of said rollers to impart rotation in the reverse direction to the normally non-rotating rollers, and means independent of said conveyor for moving said coupled brake shoe means between said positions.

2. A device as claimed in claim 1 in which said means for moving said correlated brake shoe means comprises a power operated device operatively connected to one of said upper and lower brake shoe means, and control means for controlling the operation of said brake shoe means.

3. The combination with a longitudinally extending roller slat conveyor having upper and lower reaches and having the roller slats thereof rotatable and freely supported, whereby they normally travel without rotation on conveyor operation, of brake shoe means disposed above and below the upper reach of said conveyor at a point along its length, means coupling and vertically spacing said brake shoe means a distance greater than the diameter of said rollers, said brake shoe means being movable between a position with the upper brake shoe means engaging the upper surfaces of rollers arriving at said point along the conveyor length and the lower brake shoe means clear of said rollers to impart rotation in one direction to the normally non-rating rollers, a reverse position with said lower brake shoe means engaging the under surfaces of rollers arriving at said point and said upper brake shoe means clear of said rollers to impart rotation in the reverse direction to the normally non-rotating rollers, and a position with both of said brake shoe means clear of said rollers, and means for actuating said brake shoe means.

4. A device as claimed in claim 3 in which said upper and lower brake shoe means are substantially in vertical registration and move in a linear vertical path.

5. The combination with a roller slat conveyor comprising an endless series of transversely disposed rotatable rollers supported free of positive rolling contact, and means for translating said rollers without rotation longitudinally of the conveyor in one direction in an upper reach of the conveyor and a reverse direction in an under reach of the conveyor, of a pair of spaced upper brake shoes arranged above and disposed adjacent the ends of the rollers of the upper reach of the conveyor at a point along its length, said brake shoes being movable to and from the conveyor into and out of engagement with the ends of the upper surfaces of rollers arriving at said point to arrest and restore normal conveyor feed respectively at said point, a lower brake shoe arranged below the rollers of the upper reach of said conveyor at said point along its length directly below the aforesaid brake shoes, said lower brake shoe being movable into and out of engagement with the under surfaces of rollers arriving at said point to accelerate and restore normal conveyor feed respectively at said point, means for effecting movement of said upper and lower brake shoes into and out of roller engagement, and means for coordinating movement of said upper and lower brake shoes to maintain the upper brake shoes of roller engagement while the lower brake shoe is in roller engagement and vice versa.

6. The combination with a longitudinally extending roller slat conveyor having upper and lower reaches of transversely extending bodily translatable and rotatable rollers supported free from positive rolling contact and means for effecting roller translation, of brake shoe means disposed above and below the upper reach of said conveyor at a point along its length, vertically shiftable means connecting the brake shoes above and below said upper conveyor reach and vertically spacing said brake shoe means a distance greater than the diameter of said rollers, power operated means for effecting vertical movement of said brake shoe means between positions in which the brake shoe means below said upper conveyor reach engage the under surfaces of rollers arriving at said point and the brake shoe means above said upper conveyor reach are above and out of engagement with the upper surfaces of rollers arriving at said point to accelerate normal conveyor feed at said point and vice versa to arrest normal conveyor feed at said point, and a control system for controlling said power operated means.

7. A device as claimed in claim 6 in which means are provided to actuate said brake shoe means to an intermediate position in which both the brake shoe means above and below the upper conveyor reach are out of engagement with the rollers arriving at said point along the conveyor to allow normal conveyor feed at said point.

8. A device as claimed in claim 7 in which said last-mentioned means comprises a cam arranged to engage the means connecting said brake shoe means above and below the upper conveyor reach to cam said brake shoes to said intermediate position, and means for actuating said cam.

9. The combination with a longitudinally extending roller slat conveyor having upper and lower reaches of transversely extending bodily translatable and rotatable rollers supported free from positive rolling contact and means for effecting roller translation, of brake shoe means disposed above and below the upper reach of said conveyor at a point along its length, vertically shiftable means connecting the brake shoe means above and below said upper conveyor reach and vertically spacing said brake shoe means a distance greater than the diameter of said rollers, power operated means for effecting vertical movement of said brake shoe means between positions in which the brake shoe means below said upper conveyor reach engage the under surfaces of rollers arriving at said point and the brake shoe means above said upper conveyor reach are above and out of engagement with the upper surfaces of rollers arriving at said point to accelerate normal conveyor feed at said point, and vice versa to arrest normal conveyor feed at said point and a control system for controlling said power operated means, said brake shoe means being mounted on a frame shiftable longitudinally of said conveyor.

10. A device as claimed in claim 9 in which means are provided for releasably locking said frame to said conveyor at points along its length.

11. The combination with a longitudinally extending roller slat conveyor having upper and lower reaches of transversely extending bodily translatable and rotatable rollers supported free from positive rolling contact and means for effecting roller translation, of brake shoe means disposed above and below the upper reach of said conveyor at a point along its length, vertically shiftable means connecting the brake shoe means above and below said upper conveyor reach and vertically spacing said brake shoe means a distance greater than the diameter of said rollers, an electrically controlled power operated device for effecting vertical movement of said brake shoe means between positions in which the brake shoe means below said upper conveyor reach engage the under surfaces of rollers arriving at said point and the brake shoe means above said upper conveyor reach are above and out of engagement with the upper surfaces of rollers arriving at said point to accelerate normal conveyor feed at said point and vice versa, to arrest normal conveyor feed at said point, and a control system for controlling said power operated device comprising an electrical control circuit including switch means for actuating said power operated device to effect engagement of the brake shoe means below the upper conveyor reach with the under surfaces of rollers arriving at said point along the conveyor length, and a timing device to effect operation of said power operated device to release said latter brake shoe means from roller engagement and effect engagement of said brake shoe means above the upper reach of the conveyor with the upper surfaces of rollers arriving at said point after a predetermined time delay.

12. A device as claimed in claim 11 in which said circuit includes a further normally closed switch arranged to short circuit the aforesaid switch means and timing device to actuate said power operated device to move the brake shoe means below the upper conveyor reach into roller engagement, said normally closed switch means being disposed in the path of articles arriving at said point along said conveyor to be operated by such articles to effect actuation of said power operated device to release the under brake shoe means from roller engagement and effect movement of the brake shoe means above said upper conveyor reach into roller engagement.

13. In a roller slat conveyor a pair of transversely spaced endless chain elements, a series of rollers extending transversely between and rotatably supported by said endless chain elements to form an endless series of rotatable slats, said slats being supported free from positive rolling contact, means for driving said endless chain elements in one direction along an upper longitudinally extending horizontal reach and in the opposite direction along a corresponding lower return reach, longitudinal frame members disposed beneath and forming supports for the upper reaches of said chain elements, a brake shoe device comprising a carriage supported by said longitudinal frame members to move longitudinally thereof, means for securing said carriage to said frame members at selected points along their length, brake shoe means carried by said carriage and disposed above the upper reaches of said endless chain elements at a point along their length and vertically shiftable relative to said frame members to bring said brake shoe means into and out of engagement with the upper surfaces of rollers carried by said endless chain elements arriving at said point of the upper reach of said endless chain elements to arrest and restore normal conveyor feed respectively at said point, and means independent of said conveyor for controlling the movement of said brake shoe means into and out of roller engagement.

14. A device as claimed in claim 13 in which said longitudinal frame members are channels, and said carriage is provided with rollers rolling on the flanges of said channels, and the means for securing said carriage in position comprises a releasable clamp device to clamp said carriage to the channel flanges.

15. A device as claimed in claim 13 in which said brake shoe means carried by said carriage is urged towards engagement with the rollers arriving beneath said brake shoe means, and power operated means are mounted on said carriage for lifting said brake shoe means out of roller engagement, and means are provided for controlling said power operated means.

16. A device as claimed in claim 15 in which said power operated means are electrically controlled, and the means for controlling said power operated means comprises an electrical circuit arrangement including a time delay device to actuate said power operated means for a predetermined period, and a control switch for energizing said electrical circuit arrangement.

17. A device as claimed in claim 13 in which further brake shoe means are carried by said carriage, said latter brake shoe means being disposed beneath the upper reaches of said endless chain elements and vertically shiftable relative to said frame members into and out of engagement with the under surfaces of rollers carried by said endless chain elements arriving above said latter brake shoe means, and the means for controlling movement of the first-mentioned brake shoe means is arranged to actuate the second-mentioned brake shoe means to maintain said second-mentioned brake shoe means out of contact with said rollers when said first-mentioned brake shoe means are in roller engagement and vice versa.

References Cited in the file of this patent

UNITED STATES PATENTS

| 2,130,323 | Lueckel | Sept. 13, 1938 |

FOREIGN PATENTS

| 280,674 | Great Britain | Nov. 24, 1927 |